United States Patent
Brown

(10) Patent No.: US 12,375,810 B2
(45) Date of Patent: Jul. 29, 2025

(54) METHOD FOR OPTICAL IMAGE STABILIZATION BASED ON A CHANGE IN TILT OF AN OPTICAL IMAGE STABILIZATION ASSEMBLY

(71) Applicant: CAMBRIDGE MECHATRONICS LIMITED, Cambridge (GB)

(72) Inventor: Andrew Benjamin Simpson Brown, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 159 days.

(21) Appl. No.: 18/036,955

(22) PCT Filed: Nov. 17, 2021

(86) PCT No.: PCT/GB2021/052981
§ 371 (c)(1),
(2) Date: May 15, 2023

(87) PCT Pub. No.: WO2022/106820
PCT Pub. Date: May 27, 2022

(65) Prior Publication Data
US 2023/0421903 A1    Dec. 28, 2023

(30) Foreign Application Priority Data
Nov. 17, 2020   (GB) ..................... 2018081

(51) Int. Cl.
*H04N 23/68*   (2023.01)
(52) U.S. Cl.
CPC ................. *H04N 23/687* (2023.01)

(58) Field of Classification Search
CPC ... H04N 23/687; H04N 23/6845; H04N 23/68
See application file for complete search history.

(56) References Cited

U.S. PATENT DOCUMENTS

| 12,063,441 B1* | 8/2024 | Dhanda ............... H04N 23/687 |
| 2005/0185058 A1 | 8/2005 | Sablak |
| 2007/0071429 A1* | 3/2007 | Woehler .................. G03B 5/08 396/89 |
| 2011/0249131 A1 | 10/2011 | Topliss et al. |

(Continued)

OTHER PUBLICATIONS

Borys Golik, "Development of a test method for image stabilizing systems," Cologne, Oct. 21, 2006 (48 pages) https://image-engineering.de/content/library/diploma_thesis/borys_golik_image_stabilizers.pdf.

(Continued)

*Primary Examiner* — Padma Haliyur
(74) *Attorney, Agent, or Firm* — Van Hoven PC; Stefan D. Osterbur; Joshua Van Hoven

(57) ABSTRACT

A computer-implemented method for providing optical image stabilisation, the computer-implemented method comprising: receiving data indicative of a change in tilt of an optical image stabilisation assembly that comprises an image sensor and a lens element arranged to focus an image on the image sensor; and generating data for moving, relative to the image sensor, the lens element by a distance at least partially dependent on the change in tilt in order to stabilise an image portion of the image to provide a stabilised image; and adjusting a scaling of the distance to the change in tilt.

20 Claims, 4 Drawing Sheets

(56) References Cited

U.S. PATENT DOCUMENTS

| | | | |
|---|---|---|---|
| 2018/0031861 A1* | 2/2018 | Juhola | G02B 27/646 |
| 2018/0321503 A1* | 11/2018 | Brown | G02B 27/646 |
| 2018/0348593 A1* | 12/2018 | Brown | G03B 3/10 |
| 2019/0041661 A1 | 2/2019 | Murakami | |
| 2019/0066275 A1* | 2/2019 | Ito | H04N 23/95 |
| 2019/0191088 A1* | 6/2019 | Murashima | H04N 23/689 |
| 2020/0296289 A1* | 9/2020 | Kulik | H04N 23/687 |
| 2021/0105408 A1* | 4/2021 | Hirai | H04N 23/667 |
| 2024/0040256 A1* | 2/2024 | Jang | H04N 23/54 |

OTHER PUBLICATIONS

Examination and Search Report of GB Application GB2018081.6 dated Aug. 17, 2021.
International Search Report and Written Opinion of PCT/GB2021/052981 dated Mar. 3, 2022.

* cited by examiner

METHOD FOR OPTICAL IMAGE STABILIZATION BASED ON A CHANGE IN TILT OF AN OPTICAL IMAGE STABILIZATION ASSEMBLY

CROSS-REFERENCE TO RELATED APPLICATIONS

This application is a national stage application under 35 U.S.C. § 371 of International Application No. PCT/GB2021/052981, filed Nov. 17, 2021, which claims priority of GB Patent Application No. 2018081.6, filed Nov. 17, 2020, the disclosures of each of which are hereby incorporated by reference herein in their entireties.

FIELD

The present invention relates to a computer-implemented method for providing optical image stabilisation and an optical image stabilisation assembly for providing the same.

BACKGROUND

Optical image stabilisation (OIS) is typically used to compensate for camera shake. That is, vibration or tilt of the camera apparatus typically caused by user hand movement that degrades the quality of an image captured by an image sensor. OIS by processing of a captured image is possible in principle but requires significant processing power.

There have been developed various mechanical OIS techniques, which may involve detection of the vibration by a sensor, and adjustment of the camera apparatus to compensate for the sensed vibration.

A number of actuator arrangements employing mechanical OIS techniques are known and applied relatively successfully in relatively large camera apparatuses, such as digital cameras, but are difficult to miniaturise. Cameras have become very common in a wide range of portable electronic equipment, for example mobile telephones and tablet computers, and in many such applications miniaturisation of the camera is important. This presents difficulties when attempting to include mechanical OIS assemblies into camera arrangements.

In addition, existing OIS methods are not capable of providing effective OIS across the whole of an image; optimum OIS is typically localised to an area of the image, with sub-optimal OIS being provided in the remainder of the image.

SUMMARY

The invention is defined by the independent claims to which reference should now be made. Optional features are set forth in the dependent claims.

Lens shift or image sensor shift can be used to suppress the impact of camera shake on an image. However, in prior art systems, it is not possible to effectively or completely remove the effect of shake on the image at both the edge of the image and centre of the image at the same time. This is because compensating for camera shake to provide OIS at different portions of an image requires a different motion of the lens or sensor, such as a different distance of movement. The inventors of the present invention have appreciated that the location or position of a portion of an image at which optimum OIS is achieved may be adjusted.

Arrangements of the present invention described herein provide a method and apparatus for optical image stabilisation capable of providing effective OIS at different portions of an image and ultimately effective OIS across the entirety of an image, thus providing a better quality image.

According to an aspect of the present invention, there is provided a computer-implemented method for providing optical image stabilisation, the computer-implemented method comprising: receiving data indicative of a change in tilt of an optical image stabilisation assembly that comprises an image sensor and a lens element arranged to focus an image on the image sensor; generating data for moving, relative to the image sensor, the lens element by a distance at least partially dependent on the change in tilt in order to stabilise an image portion of the image to provide a stabilised image; and adjusting a scaling of the distance to the change in tilt. The scaling of the distance to the change in tilt (or gyro gain) is adjusted. The scaling of the distance to the change in tilt (or gyro gain) may be adjusted, in particular, while providing optical image stabilization. For example, OIS may be performed based on a first value of the scaling, and OIS may subsequently be performed based on a second value of the scaling that is different to the first value of the scaling. The scaling or gyro gain may be the distance the lens element is moved relative to the image sensor in response to a determined shake to be suppressed. The data indicative of a change in tilt may be received from a determiner configured to determine the change in tilt of the OIS assembly. The computer-implemented method may comprise controlling the determiner to determine the change in tilt. The generating the data for moving the lens element may comprise controlling the movement of the lens element. Alternatively or in addition, the steps of controlling the determiner and/or the movement of the lens element relative to the image sensor may be controlled a controller. For example, an integrated circuit may comprise the controller.

An image portion of the image is stabilised by movement (e.g. perpendicular to the optical axis) of the lens element relative to the image sensor in order to compensate for the change in tilt. Stabilisation of the image portion may be optimum stabilisation. In other words, movement of the lens element relative to the image sensor will provide OIS to some degree across the entirety of the image, but optimum or most effective OIS is provided at the image portion. The inventors have appreciated the possibility of adjusting the location of optimum OIS on an image by adjusting the scaling of the distance to the change in tilt. The location of the image portion on the image may depend on the distance of movement of the lens element relative to the image sensor. The scaling of the distance to the change in tilt may be adjusted so as to provide improved optical image stabilization for the image portion compared to a situation in which the scaling of the distance to the change in tilt is not adjusted.

Depending on the scaling, optimum suppression of camera shake may be achieved at different portions of the image. For example, the scaling may be adjusted to adjust the radial distance from a centre of the image where the most effective suppression of image shake is to be achieved. That is, the adjusting the scaling of the distance to the change in tilt may be at least partially dependent on a radial distance of the image portion from a centre of the image. For example, the scaling of the distance to the change in tilt is increased for an increasing radial distance of the image portion from a centre of the image. This beneficially allows OIS to be provided at different portions of the image, and ultimately effective OIS may be provided across the entirety of an image. Optionally, the scaling may be adjusted by a user. Therefore, the location of the image portion on the image may be adjusted by a user. In other words, a user may select which portion of an image they wish to provide optimum OIS to. Alternatively, the scaling may be adjusted automatically so as to provide efficient OIS in different image portions.

The adjusting the scaling of the distance to the change in tilt may be at least partially dependent on an object distance of the lens element to an object to be imaged. For example, the distance to the change in tilt is increased for a decreasing object distance of the lens element to an object to be imaged. This may be particularly applicable when the camera is relatively close to the object, as the distance between the lens element and the image sensor is not negligible in relation to the distance from the object to the lens element. The computer-implemented method may further comprise the step of determining the distance from the lens element to an object being imaged. The determining the distance from the lens element to the object being imaged may comprise using a time-of-flight sensor configured to determine the distance from the lens element to the object being imaged. A time-of-flight sensor system uses time-of-flight to resolve distance between a sensor and an object. The time-of-flight is measured, for example, by measuring the round trip time of an artificial light signal or pulse to and then reflected from the object. Thus, the distance to the subject is half the product of speed of light ($3 \times 10^8$ ms$^{-1}$) and measured time of flight to and from the object.

In some embodiments, in particular in embodiments in which it is appropriate to use the thin lens equation, the scaling of the distance to the change in tilt may approximately be equal to the term:

$$\frac{1}{\left(\frac{1}{f} - \frac{1}{d}\right)} \frac{(\tan(\theta + \alpha) - \tan(\theta))}{\alpha},$$

where f is the effective focal length of the lens element, d is the object distance of the lens element to an object to be imaged, α is the change in tilt, and θ is the angle at the lens element between the image portion and a centre of the image.

$$\frac{1}{\left(\frac{1}{f} - \frac{1}{d}\right)} \tan(\theta)$$

is the radial distance of the image portion from the centre of the image, in particular before the change in tilt. The scaling of the distance to the change in tilt may be approximately equal to the term, for example, to the extent that the scaling is within 10%, preferably within 5% or within 1% of the above term. It will be appreciated that the scaling need not be exactly equal to the above term for the present invention to provide an advantageous technical effect.

In some embodiments, the object distance need not be taken into account. The scaling of the distance to the change in tilt may approximately be equal to the term:

$$v \frac{(\tan(\theta + \alpha) - \tan(\theta))}{\alpha},$$

where v is the distance between lens element and image sensor, α is the change in tilt, and θ is the angle at the lens element between the image portion and the centre of the image. v tan(θ) is the radial distance of the image portion from the centre of the image, in particular before the change in tilt.

In some embodiments, the radial distance of the image portion from a centre of the image need not be taken into account. The scaling of the distance to the change in tilt may approximately be equal to the term:

$$\frac{1}{\left(\frac{1}{f} - \frac{1}{d}\right)} \frac{\tan(\alpha)}{\alpha},$$

where f is the effective focal length of the lens element, d is the object distance of the lens element to an object to be imaged, and a is the change in tilt.

It will be appreciated that the teachings of the present application go beyond the approximation of the equations above. In particular, the present invention may be used with lens elements for which the thin lens equation does not hold. The present invention may be used with lenses having a relatively large fields of view, such as fish-eye lenses, for example.

The computer-implemented method may further comprise the steps of: controlling the image sensor to obtain a plurality of images, each image of the plurality of images comprising an image portion, the image portion of each of the plurality of images being located at a different radial distance from a centre of their respective image; and controlling the lens element to move relative to the image sensor in order to stabilise the image portions of each image of the plurality of images to provide a plurality of stabilised image portions. The method may further comprise the step of combining the plurality of stabilised image portions to provide a stabilised resultant image.

In some scenarios such as in low light conditions, a number of exposures or images may be captured and then the data from the different images may be combined to create a single high quality image. In arrangements of the present invention, the gyro gain may be adjusted during the gathering of these images so that the OIS provides good suppression in different regions of the image for different exposures. Generally, multiple exposures may be captured specifically for the purpose of improved OIS, so independent from any multiple exposures due to low light conditions or other such scenarios. The image portions having high OIS may then be combined from different images to provide a resultant image having improved OIS across the entirety of the image. This thereby decreases the number of exposures required to create a high quality image or increase the quality of the image that is created through ensuring that all portions of the image have some exposures where the shake is optimally or more effectively suppressed.

The computer-implemented method may further comprise the step of controlling a second lens element arranged to focus a second image on a second image sensor to move, relative to the second image sensor, a distance at least partially dependent on the change in tilt in order to stabilise an image portion of the second image, wherein the image portion of the first image is a centre portion and stabilising the image provides a stabilised centre portion, and the image portion of the second image is an outer portion and stabilising the second image provides a stabilised outer portion. The method may further comprise the step of combining the stabilised centre portion and stabilised outer portion to provide a stabilised combined image.

Such an embodiment may be provided in a system with a plurality of cameras. In such a multi camera system (such as a mobile phone with multiple cameras) the scaling may be adjusted such that the OIS on different cameras is tuned to remove the effect of camera shake at different image portions, such as at different radial distances form the centre of the image. These images may then be combined to create an image that uses the information from the different image sensors in the regions where the OIS is tuned to suppress well. Thus, effective OIS can be provided at the entirety of the resultant image.

An example embodiment may comprise two cameras, each camera having a different field of view. That is, the image sensor of each camera may have a different field of view. For example, a first camera may have a wider field of view than a second camera having a narrow field of view. The camera with the wide field of view may have the scaling adjusted such that the OIS is tuned to suppress the effect of camera shake in the region that is outside or at the edges of the field of view of the narrow field of view camera. That is, the scaling may be adjusted such that the image suppression is optimised or more effective, for the wide angle camera, at the portion outside of the field of view of the camera with the narrow field of view. The scaling may then be adjusted such that OIS is optimised or more effective for the narrow field of view camera at a substantially central region. The image portions from each image having effective OIS may then be combined to provide an image with effective OIS across its entirety.

The movement of the lens element relative to the image sensor may be provided by movement of the lens element or by movement of the image sensor. The lens element may be stationary whilst the image sensor moves. The image sensor may be stationary whilst the lens element moves. Movement of the image sensor may be more convenient, as the image sensor is a smaller component than the lens assembly. This may facilitate further miniaturisation of the camera assembly.

A total area of the image portion may be a fraction of a total area of the image. This way, optimum OIS is provided at a particular portion of the image. The position of the image portion in the image may be configured to be selected. The image portion may be located at least partially at an edge of the image. In some embodiments, the image portion may be located substantially around the edge of the image.

The determiner may be configured to determine the data indicative of change in tilt by determining an angular velocity of the optical image stabilisation assembly, and convert the determined angular velocity of the optical image stabilisation assembly to determine an angle of tilt or change in tilt. The determining the data indicative of change in tilt of the optical image stabilisation assembly may comprise using a vibration sensor, such as a gyroscope.

The lens element may comprise a lens carrier on which one or more lenses are supported. The diameter of the lenses may be relatively small. For example, the diameter of the one or more lenses may be at most 10 mm. The movement of the lens element relative to the image sensor may be in a plane perpendicular to an optical axis of the image sensor.

The method may comprise controlling the lens element to move relative to the image sensor by controlling an actuator mechanism to drive movement of the lens element relative to the image sensor. The actuator mechanism may comprise at least one shape memory alloy (SMA) wire and the controlling the actuator mechanism to drive movement of the lens element relative to the image sensor may comprise controlling the at least one SMA wire to contract.

The actuator mechanism may comprise a plurality of SMA wires. For example, in some embodiments, the actuator mechanism may comprise four SMA wires. The method may further comprise a control circuit outputting a signal such as a control signal to control the actuation of the actuator mechanism.

According to another aspect of the present invention, there is provided an optical image stabilisation assembly for providing optical image stabilisation, the optical image stabilisation assembly comprising: an image sensor configured to obtain an image; a lens element arranged to focus the image on the image sensor; and a determiner for determining a change in tilt of the optical image stabilisation assembly; and a controller configured to move the lens element relative to the image sensor by a distance at least partially dependent on the change in tilt in order to stabilise an image portion of the image to provide a stabilised image, wherein the controller is configured to adjust a scaling of the distance to the change in tilt.

The OIS assembly may further comprise a support structure. The image sensor may be supported by the support structure. The lens element may also be supported by the support structure, for example in a manner allowing movement relative to the image sensor.

An image portion of the image is stabilised by movement of the lens element relative to the image sensor in order to compensate for the change in tilt. Stabilisation of the image portion may be optimum or effective stabilisation. In other words, movement of the lens element relative to the image sensor will provide OIS to some degree across the entirety of the image, but optimum or more effective OIS is provided at the image portion. OIS in the image portion may be more effective that OIS in a portion of the image other than the image portion. A total area of the image portion may be a fraction of a total area of the image. For example, different image portions may comprise a central circle and concentric rings. The inventors have appreciated the possibility of adjusting the location of optimum OIS on an image by adjusting the scaling of the distance to the change in tilt. The location of the image portion on the image may depend on the distance of movement of the lens element relative to the image sensor.

Depending on the scaling, optimum suppression of camera shake may be achieved at different portions of the image. For example, the scaling may be adjusted to adjust the radial distance from a centre of the image where the most effective suppression of image shake is to be achieved. That is, the adjusting the scaling of the distance to the change in tilt may be at least partially dependent on a radial distance of the image portion from a centre of the image. This beneficially allows OIS to be provided at different portions of the image, and ultimately effective OIS may be provided across the entirety of an image. Optionally, the scaling may be adjusted by a user. Therefore, the location of the image portion on the image may be adjusted by a user. In other words, a user may select which portion of an image they wish to provide optimum OIS to. Alternatively, the scaling may be adjusted automatically so as to provide efficient OIS in different image portions.

The adjustment of the scaling of the distance to the change in tilt may be at least partially dependent on an object distance of the lens element to an object being imaged. The OIS assembly may therefore be configured to determine the distance from the lens element to an object being imaged.

The OIS assembly may comprise a time-of-flight sensor configured to determine the distance from the lens element to the object being imaged.

The determiner may comprise a vibration sensor, such as a gyroscope. The determiner determining the change in tilt may comprise the determiner determining an angular velocity of the OIS assembly, and converting the determined angular velocity of the OIS assembly to a determined change in tilt, which may be a determined angle of tilt.

The image sensor may be configured to obtain a plurality of images, each image of the plurality of images comprising an image portion, the image portion of each of the plurality of images being located at a different radial distance on their respective image; and the lens element may be configured to move relative to the image sensor in order to stabilise the image portions of each image of the plurality of images to provide a plurality of stabilised image portions. The camera assembly may be configured to combine the plurality of stabilised image portions to provide a stabilised resultant image. Multiple exposures or images may be captured, and OIS may be optimised by adjustment of the scaling for each image capture such that image portions are located differently on each image. Therefore, the stabilised image portions from different images may be combined to provide an image having optimum or more effective OIS substantially across its entirety. The multiple exposures may be captured by one or more cameras. The resultant composite image may be stabilized to a better degree than any single one of the plurality of images.

The OIS assembly may further comprise: a second image sensor configured to obtain a second image; and a second lens element arranged to: focus the second image on the second image sensor; and move, relative to the second image sensor, a second distance dependent on the determined tilt in order to stabilise an image portion of the second image, wherein the image portion of the first image is a centre portion and stabilising the image provides a stabilised centre portion, and the image portion of the second image is an outer portion and stabilising the second image provides a stabilised outer portion. The stabilised centre portion and the stabilised outer portion may be configured to be combined to provide a stabilised combined image. In a multi-camera system, the scaling of each camera may be adjusted such that the image portion is located differently at each image captured by each camera, resulting in optimum OIS being provided at different areas of each image. The resulting stabilised image portions may therefore be combined to provide an image having optimum or more effective OIS substantially across its entirety.

The support structure may be a first support structure, and the OIS assembly may further comprise a second support structure. One or both of the second image sensor and the second lens element may be supported by the second support structure. The second image sensor and/or the lens element may be alternatively supported by the first support structure.

The controller may be a first controller, and the OIS may further comprise a second controller configured to control movement of the second lens element relative to the second image sensor. Alternatively, control of movement of the second lens element relative to the second image sensor may be performed by the first controller.

The movement of the lens element relative to the image sensor may be provided by movement of the lens element or by movement of the image sensor. The movement of the lens element relative to the image sensor may be in a plane perpendicular to an optical axis of the image sensor.

The optical imager stabilisation assembly may further comprise an actuator mechanism configured to drive the movement of the lens element relative to the image sensor.

The actuator mechanism may comprise at least one shape memory alloy (SMA) wire and the movement of the lens element relative to the image sensor may be driven by contraction of the at least one SMA wire.

The actuator mechanism may comprise a plurality of SMA wires. For example, in some embodiments, the actuator mechanism may comprise four SMA wires. The OIS assembly may further comprise a control circuit configured to output a signal such as a control signal to control the actuation of the actuator mechanism. The controller may comprise the control circuit, or the control circuit may be separate to the controller.

According to another aspect of the disclosure, there is provided a computer program for performing the method set out above.

According to another aspect of the disclosure, there is provided a non-transitory computer-readable medium comprising instructions for performing the method set out above. The non-transitory computer-readable medium may be, for example, a solid state memory, a microprocessor, a CD or DVD-ROM, programmed memory such as non-volatile memory (such as Flash), or read-only memory (firmware), or on a data carrier such as an optical or electrical signal carrier.

BRIEF DESCRIPTION OF THE DRAWINGS

Certain embodiments of the presently-claimed invention will now be described, by way of example only, with reference to the accompanying drawings, in which:

Like features are denoted by like reference numerals.

DETAILED DESCRIPTION

An example optical stabilisation assembly will be described with reference to FIG. 1.

Figure 1:
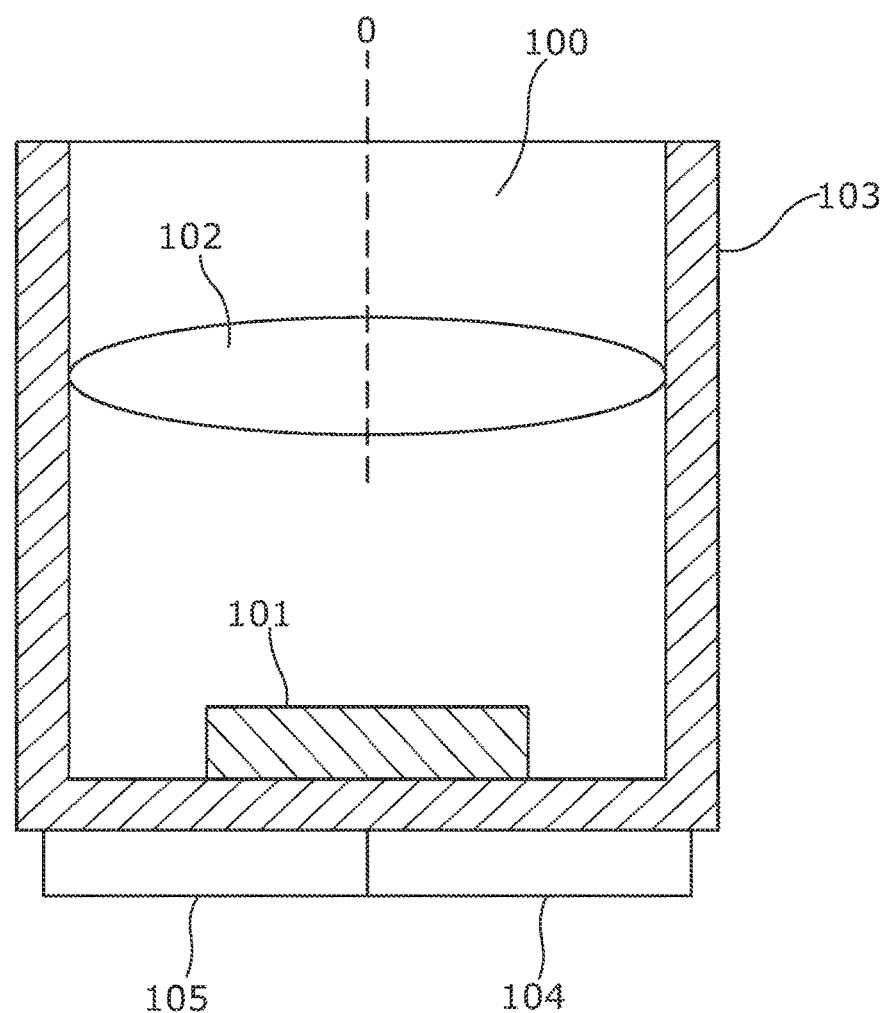
FIG. 1 is a schematic diagram of an optical image stabilisation assembly embodying an aspect of the present invention.

FIG. 1 illustrates a cross-sectional view of an optical image stabilisation assembly 100, the cross-section being taken along an optical axis O of the OIS assembly 100, and specifically of the image sensor 101 of the OIS assembly 100.

In this example, the OIS assembly 100 is incorporated in a portable electronic device, which in this example is a mobile telephone. It will be appreciated, however, that the OIS assembly 100 may be incorporated into any suitable device.

The OIS assembly 100 comprises a support structure 103. The support structure 103 is in connection with and supports a lens element 102 and the image sensor 101. The lens element 102 and the image sensor 101 are arranged along the optical axis O such that the lens element 102 focuses an image onto the image sensor 101. The image sensor 101 captures the image and may be of any suitable type. For example, the image sensor 101 may be a charge-coupled device (CCD) or a complimentary metal-oxide semiconductor (CMOS) device. In this example, the lens element 102 comprises a lens with a diameter of 10 mm.

The OIS assembly 100 further comprises SMA wires (not shown), and in this example four SMA wires, each connected to the support structure 103 and to the lens element 102. The four SMA wires are arranged such that, on contraction of one or more of the SMA wires, the lens element 102 is moved relative to the image sensor 101 in a plane perpendicular to the optical axis O. For example, the four SMA wires may be arranged to substantially surround the lens element 102 such that selective contraction of one or more of the SMA wires enables movement of the lens element 102 in all directions in the plane. The OIS assembly 100 may, for example, comprise the SMA actuation apparatus of WO 2013/175197 A1, which is herein incorporated by reference, to effect movement of the lens element 102 relative to the support structure 103. In general, the OIS assembly may comprise any actuator apparatus capable of moving the lens element 102 relative to the support structure 103 for the purpose of providing OIS.

The OIS assembly 100 also comprises a determiner 104. The determiner 104 is configured to determine data indicative of a change in tilt of the OIS assembly 100. For example, a change in tilt may be imparted by a user. The determiner 104 comprises a vibration sensor, in this case a gyroscope, which determines an angular velocity of the OIS assembly during a camera shake. The determiner 104 then converts the angular velocity to a change in tilt.

As will be described in more detail below, a controller 105 then controls movement of the lens element 102 relative to the image sensor 101 in a plane perpendicular to the optical axis O in order to provide OIS to the image being captured. Specifically, the controller 105 controls actuation of the four SMA wires of the actuator mechanism.

In this example and the examples explained below, the relative movement is provided by movement of the lens element 102, whilst the image sensor 101 remains relatively stationary. However, it will be understood that the image sensor 101 could equally provide the relative movement by moving whilst the lens element 102 remains relatively stationary in a plane orthogonal to the optical axis O. In such embodiments, the OIS assembly 100 may, for example, comprise the camera assembly of WO 2017/072525 A1, which is herein incorporated by reference.

An example method for optical image stabilisation will be described with reference to FIGS. 2 to 4.

Figure 2:
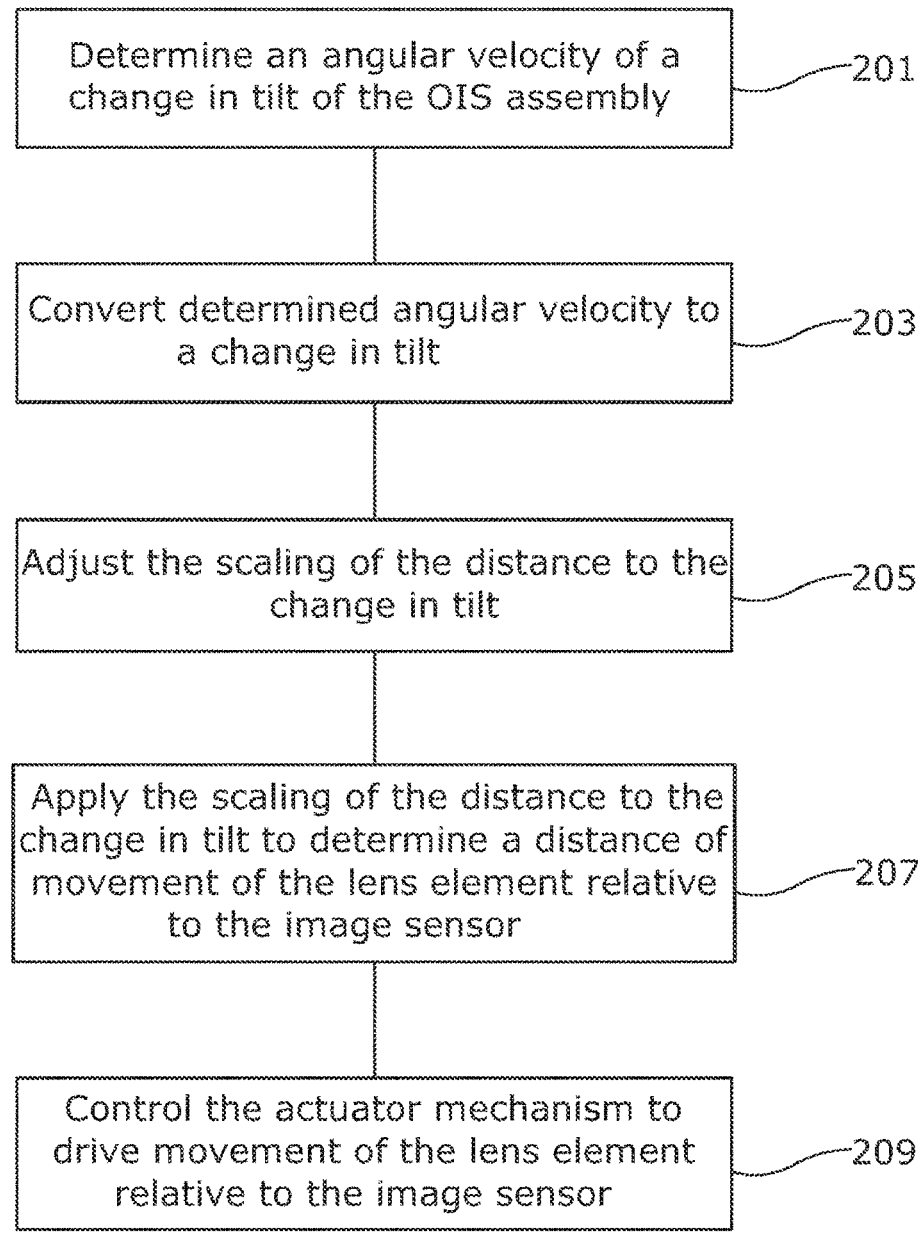
FIG. 2 is a flow diagram describing a computer-implemented method embodying an aspect of the present invention.

FIG. 2 illustrates a flow diagram of a portion of the computer-implemented method for providing optical image stabilisation. In particular, the steps from determining a change in tilt, to adjusting the movement of the lens element 102 relative to the image sensor 101 to compensate for the change in tilt are described.

Prior to step 201, the OIS assembly 100 is prepared to be in use. For example, a user prepares to capture an image of an object using a camera comprising the OIS assembly 100. During capture of the image (during exposure of the image sensor 101), camera shake is imparted onto the camera. Here, the camera shake is imparted as a rotation of the camera caused by the user. Said camera shake will adversely affect the image if not compensated for, and thus the OIS assembly 100 is arranged to provide OIS to the image being captured.

At step 201, data indicative of a change in tilt is determined in the form of an angular velocity of the rotation of the OIS assembly 100. In this example, the angular velocity is determined by the determiner 104 and specifically by the gyroscope. To account for the determined angular velocity and a change in tilt of the OIS assembly 100, an angle of compensation will be required to provide OIS to the image. At step 203, the determined angular velocity is converted to data indicative of a change in tilt, and specifically to a change in tilt in the form of an angle.

In order to apply effective OIS to the image portion of the image being captured, the lens element 102 must be moved a distance relative to the image sensor 101. The distance the lens element 102 is moved depends on the scaling of the distance to the change in tilt. The scaling determines where the image portion is located on the image. Determination of the scaling is set out in detail below.

The distance the lens element 102 is moved relative to the image sensor 101 determines which portion of the image the OIS is applied most optimally or more effectively; that is, the portion of the image at which the OIS is most or more effective. Thus, the location of the image portion of the image at which the OIS is most or more effective depends on the scaling. The scaling, or gyro gain, may be adjusted in order to adjust the location of the image portion on the image. In other words, the scaling, or gyro gain, may be adjusted in order to adjust the part of an image at which OIS is most or more effectively applied. This may be, for example, at the edge of an image or at the centre of an image.

At step 205, the scaling of the distance to the change in tilt is adjusted, for example automatically adjusted so as to provide OIS at different image portions. It will be understood that the steps do not necessarily need to be performed in the order of this example embodiment, and particularly that the adjustment of the scaling does not necessarily need to be performed at the same stage as this example. It may, for example, be adjusted prior to capture of an image.

At step 207, the scaling of distance to the change in tilt is applied to determine the distance the lens element 102 must be moved relative to the image sensor 101 in order to provide the OIS.

Once the distance has been determined, at step 209, the actuator mechanism is controlled to provide the movement of the lens element 102. In this example, a control circuit provides a control signal to the actuator mechanism. The control signal comprises a signal to control the necessary SMA wire or wires of the actuator mechanism to contract. The lens element 102 is therefore moved a distance in order to optimally or more effectively stabilise an image portion of an image being captured.

One example of the determination of the scaling will now be described with reference to FIGS. 3 and 4.

Figure 3:
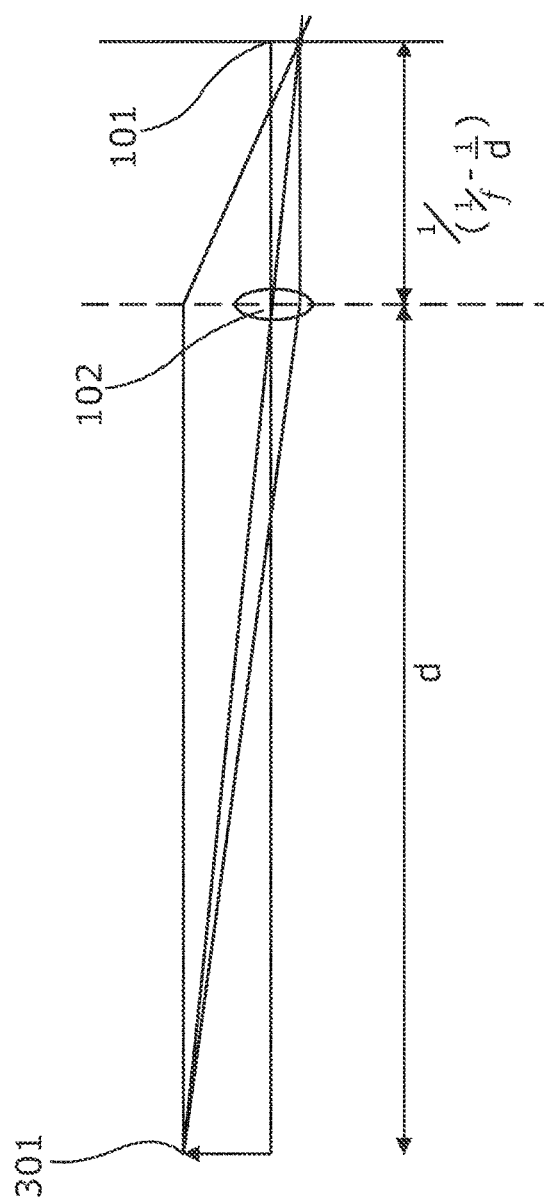
FIG. 3 is a schematic diagram of an optical image stabilisation assembly embodying an aspect of the present invention in use.

FIG. 3 illustrates a schematic diagram of an object 301 being imaged. The image of the object 301 is being captured by the camera which includes the OIS assembly. FIG. 3 in particular illustrates the position of the lens element 102 and the image sensor 101 in relation to the object 301 to be imaged.

Figure 4:
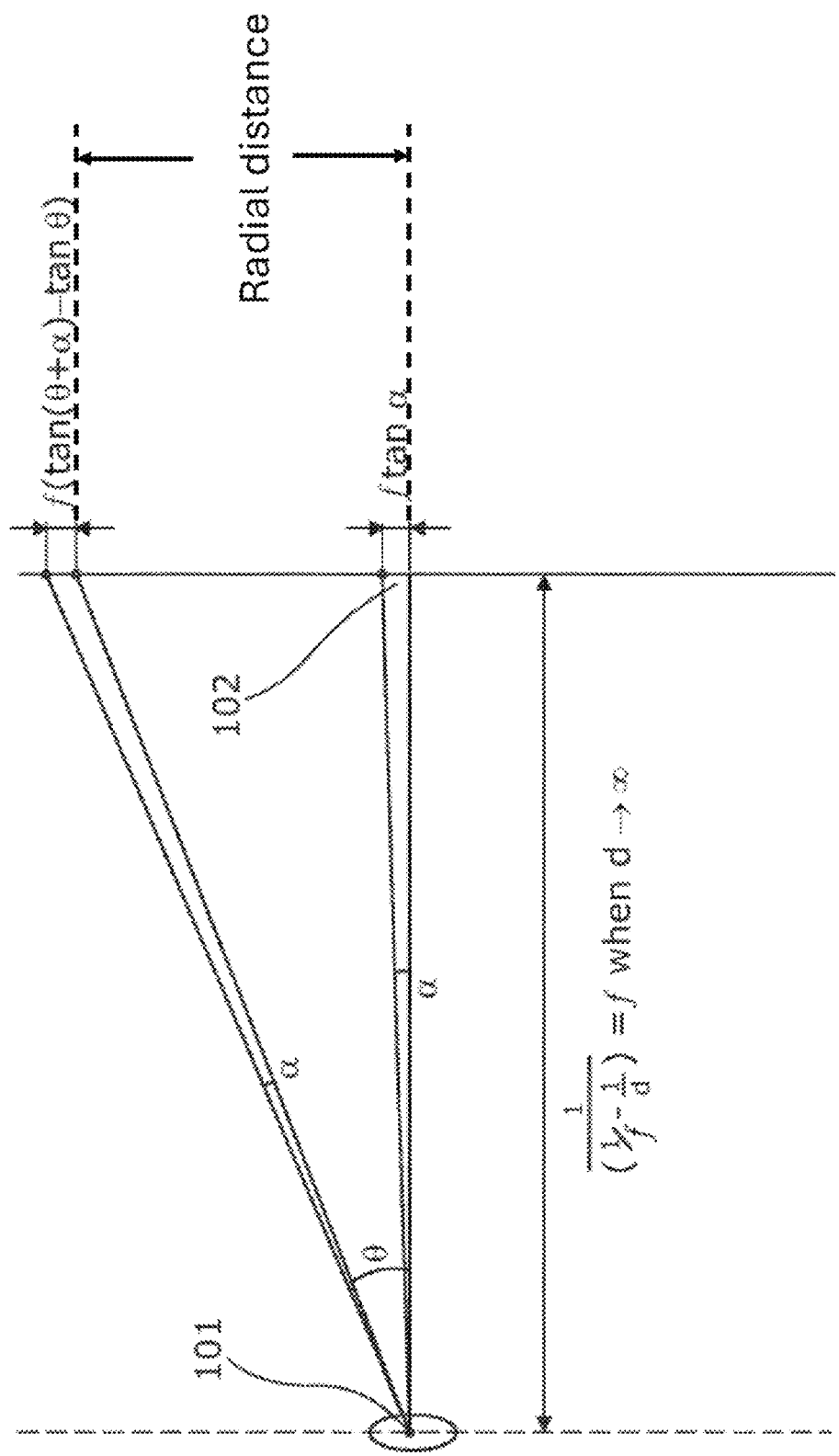
FIG. 4 is a schematic diagram of components of an optical image stabilisation assembly embodying an aspect of the present invention.

FIG. 4 illustrates a schematic view of the lens element 102 and the image sensor 101, and the movement of the lens element 102 relative to the image sensor 101.

The OIS assembly 100 comprises the lens element 102 having an effective focal length f, and the image sensor 101 with a field of view θ. An object 301 to be imaged is at a distance d from the lens element 102. The distance from the lens element 102 to the image sensor 101 is a distance v. During image capture or exposure, the optical image stabilisation assembly 100 experiences camera shake. That is, the OIS assembly is rotated or tilted, and thus experiences a change in tilt by an angle α. Determination of the change in tilt is as described above.

The scaling, and thus distance of movement of the lens element 102 required to compensate for the change in tilt, may then be calculated by applying the thin lens equation. Applied here, the equation solved for the distance v is as follows.

$$v = \frac{1}{\left(\frac{1}{f} - \frac{1}{d}\right)} \qquad \text{Equation 1}$$

The scaling may be dependent on the distance d. The scaling may differ dependent on the location of the image portion on the image. For example, the scaling may differ where the image portion is at an edge of the image, to where the image portion is substantially at the centre of an image.

In a case where θ>>a and d>>f (or when d can be considered at an infinite distance relative to f), the distance v can be considered to be equal to f. Therefore, for an image portion located substantially at the centre of the image (i.e. the impact of the shake is to be optimally suppressed at the centre of the image), the lens element 102 may be moved relative to the image sensor 101 by a distance f·tan(α) during the image capture in order to compensate for image shake and provide OIS to the image portion. Therefore, the scaling of the distance the lens element 102 is moved relative to the image sensor 101 to the change in tilt will be $$\frac{f \cdot \tan(\alpha)}{\alpha}$$

in a case where the image portion is substantially at the centre of the image.

In a case where d is not much greater than f, the distance v between the lens element 102 and the image sensor 101 is given by Equation 1. In this case, for an image portion located substantially at the centre of the image, the lens element 102 may be moved relative to the image sensor 101 by a distance $$\frac{\tan(\alpha)}{\left(\frac{1}{f} - \frac{1}{d}\right)}$$

during the image capture to compensate for the image shake and provide OIS to the image portion. Therefore, in this case, the scaling of the distance the lens element 102 is moved relative to the image sensor 101 to the change in tilt will be $$\frac{\tan(\alpha)}{\alpha\left(\frac{1}{f} - \frac{1}{d}\right)}.$$

The scaling may thus be adjusted depending on the distance d, so as to provide more efficient OIS at the centre of the image compared to a situation in which the distance d is not taken into account.

The image portion may alternatively be located substantially at the edge of an image. Assuming that d>>f, the distance v can be considered equal to f. Therefore, where the image portion is located substantially at the edge of an image (i.e. the impact of the shake is to be optimally suppressed at the edge of the image), the lens element 102 may be moved relative to the image sensor 101 by a distance f(tan(θ+a)−tan(θ)) during image capture. Therefore, the scaling of the distance the lens element 102 is moved relative to the image sensor 101 to the change in tilt will be $$\frac{f(\tan(\theta + \alpha) - \tan(\theta))}{\alpha}.$$

More generally, for image portions that are located not necessarily at the edge of the image, but also not at the centre of the image, θ may be considered to correspond to the angle at the lens element between the image portion and the centre of the image.

In some embodiments, the scaling may be adjusted depending on both the distance d and the distance of the image portion from the centre of the image. In such embodiments, the scaling of the distance the lens element 102 is moved relative to the image sensor 101 to the change in tilt will be $$\frac{1}{\left(\frac{1}{f} - \frac{1}{d}\right)}\frac{(\tan(\theta + \alpha) - \tan(\theta))}{\alpha}.$$

These examples have been described with reference to only a single image being captured. It will be appreciated that a plurality of images may be captured by a single camera, or that two or more cameras (e.g. two cameras forming a dual camera apparatus) may each capture one or more images as described above.

Taking the latter as an example, a first camera may be arranged with a lens element 102 as above with focal length f, and an image sensor 101 with a field of view θ, to image an object 301 at a distance d considered infinite relative to f. A second camera may also be arranged with a lens element with a focal length F and an image sensor with a field of view 2θ, to image the object 301 at a distance d, also considered infinite relative to F. During an exposure, there is imparted a camera shake a, and it is desired to reduce the impact of the camera shake across the entirety of the image.

The first camera captures a first image with a first image portion. The second camera captures a second image with a second image portion. The scaling of each camera is adjusted to determine the location of each image portion on its respective image. In this example, the second camera comprises a wide angle lens and has a field of view twice that of the first camera.

The scaling of the second camera (that is, the scaling of the distance of movement of the lens element of the second camera to the change in tilt) is adjusted such that OIS is optimally performed at the edge of the image. In other words, the second image portion of the second image is located at the edge of the image, and in particular, at the region outside of the field of view of the first camera. The scaling of the first camera is such that OIS is optimally or more effectively performed substantially at the centre of the image.

Once an image has been captured by each camera, the images are combined. In particular, the portions of each image having optimum OIS are combined, or the image portions of each image are combined. This results in a combined image having optimised OIS across its entirety, due to the changing of scaling for each of the two cameras enabling optimum OIS to be selectively located on the images.

Similarly to above, equivalent distances can be calculated in a case where d is not much larger than f and therefore d is not considered infinite relative to f.

Embodiments of the present invention have been described. It will be appreciated that variations and modifications may be made to the described embodiments within the scope of the present invention. For example, the adjustment of scaling may be applied in an arrangement in which a plurality of images are to be captured. The scaling may be adjusted such that the image portions of each image are differently located, thereby providing optimum or more effective OIS to different portions of the images. The optimally or more effectively stabilised portions may then be combined to form a combined image having optimum or more effective OIS substantially across its entirety.

The above examples have been described in relation to taking two images, and combining image portions of the two images to form a resultant combined image. However, it will be appreciated that the present invention may be extended to taking more than two images, so 3 or more images, so as to provide a combined image with even more effective OIS.

The invention claimed is:

1. A computer-implemented method for providing optical image stabilisation, the computer-implemented method comprising:
   receiving data indicative of a change in tilt of an optical image stabilisation assembly that comprises an image sensor and a lens element arranged to focus an image on the image sensor;
   generating data for moving, relative to the image sensor, the lens element by a distance at least partially dependent on the change in tilt in order to stabilise an image portion of the image to provide a stabilised image;
   adjusting a scaling of the distance to the change in tilt;
   controlling the image sensor to obtain a plurality of images, each image of the plurality of images comprising an image portion, the image portion of each of the plurality of images being located at a different radial distance from a centre of their respective image; and
   controlling the lens element to move relative to the image sensor in order to stabilise the image portions of each image of the plurality of images to provide a plurality of stabilised image portions.

2. The computer-implemented method according to claim 1, wherein adjusting the scaling of the distance to the change in tilt is to provide improved optical image stabilization for the image portion compared to a situation in which the scaling of the distance to the change in tilt is not adjusted.

3. The computer-implemented method according to claim 1, wherein adjusting the scaling of the distance to the change in tilt is at least partially dependent on a radial distance of the image portion from a centre of the image.

4. The computer-implemented method according to claim 3, wherein the scaling of the distance to the change in tilt is increased for an increasing radial distance of the image portion from a centre of the image.

5. The computer-implemented method according to claim 1, wherein adjusting the scaling of the distance to the change in tilt is at least partially dependent on an object distance of the lens element to an object to be imaged.

6. The computer-implemented method according to claim 5, wherein the scaling of the distance to the change in tilt is increased for a decreasing object distance of the lens element to an object to be imaged.

7. The computer-implemented method according to claim 1, wherein the scaling of the distance to the change in tilt is approximately equal to the term, $$\frac{1}{\left(\frac{1}{f} - \frac{1}{d}\right)} \frac{(\tan(\theta + \alpha) - \tan(\theta))}{\alpha},$$

where f is the effective focal length of the lens element, d is the object distance of the lens element to an object to be imaged, $\alpha$ is the change in tilt, and $\theta$ is the angle at the lens element between the image portion and a centre of the image.

8. The computer-implemented method according to claim 1, wherein movement of the lens element relative to the image sensor is controlled simultaneously with controlling the image sensor to obtain a plurality of images.

9. The computer-implemented method according to claim 1, further comprising combining the plurality of stabilised image portions to provide a stabilised resultant image.

10. The computer-implemented method according to claim 1, wherein:
    the lens element arranged to focus the image on the image sensor is a first lens element arranged to focus a first image on a first image sensor;
    the method further comprises controlling a second lens element, that is arranged to focus a second image on a second image sensor, to move, relative to the second image sensor, a distance at least partially dependent on the change in tilt in order to stabilise an image portion of the second image;
    the image portion of the first image is a centre portion and stabilising the image provides a stabilised centre portion; and
    the image portion of the second image is an outer portion and stabilising the second image provides a stabilised outer portion.

11. The computer-implemented method according to claim 1, wherein the movement of the lens element relative to the image sensor is provided by movement of the lens element or by movement of the image sensor.

12. The computer-implemented method according to claim 1, wherein a total area of the image portion is a fraction of a total area of the image.

13. The computer-implemented method according to claim 1, comprising determining the data indicative of change in tilt of the optical image stabilisation assembly using a gyroscope.

14. The computer-implemented method according to claim 1, wherein the movement of the lens element relative to the image sensor is in a plane perpendicular to an optical axis of the image sensor.

15. The computer-implemented method according to claim 1, further comprising controlling the lens element to move relative to the image sensor by controlling an actuator mechanism to drive movement of the lens element relative to the image sensor.

16. The computer-implemented method according to claim 15, wherein:
    the actuator mechanism comprises at least one shape memory alloy (SMA) wire; and controlling the actuator mechanism to drive movement of the lens element relative to the image sensor comprises controlling the SMA wire to contract.

17. An optical image stabilisation assembly for providing optical image stabilisation, the optical image stabilisation assembly comprising:
- an image sensor configured to obtain an image;
- a lens element arranged to focus the image on the image sensor;
- a determiner for determining a change in tilt of the optical image stabilisation assembly; and
- a controller configured to move the lens element relative to the image sensor by a distance at least partially dependent on the change in tilt in order to stabilise an image portion of the image to provide a stabilised image, wherein the controller is configured to adjust a scaling of the distance to the change in tilt, wherein the controller is configured to control the image sensor to obtain a plurality of images, each image of the plurality of images comprising an image portion, the image portion of each of the plurality of images being located at a different radial distance from a centre of their respective image, and wherein the controller is configured to control the lens element to move relative to the image sensor in order to stabilise the image portions of each image of the plurality of images to provide a plurality of stabilised image portions.

18. The optical image stabilisation assembly according to claim 17, further comprising an actuator mechanism comprising at least one shape memory alloy (SMA) wire configured to drive the movement of the lens element relative to the image sensor.

19. A computer-implemented method for providing optical image stabilisation, the computer-implemented method comprising:
- receiving data indicative of a change in tilt of an optical image stabilisation assembly that comprises an image sensor and a lens element arranged to focus an image on the image sensor;
- generating data for moving, relative to the image sensor, the lens element by a distance at least partially dependent on the change in tilt in order to stabilise an image portion of the image to provide a stabilised image; and
- adjusting a scaling of the distance to the change in tilt;

wherein:
- the lens element arranged to focus the image on the image sensor is a first lens element arranged to focus a first image on a first image sensor;
- the method further comprises controlling a second lens element, that is arranged to focus a second image on a second image sensor, to move, relative to the second image sensor, a distance at least partially dependent on the change in tilt in order to stabilise an image portion of the second image;
- the image portion of the first image is a centre portion and stabilising the image provides a stabilised centre portion; and
- the image portion of the second image is an outer portion and stabilising the second image provides a stabilised outer portion.

20. The computer-implemented method according to claim 19, further comprising combining the stabilised centre portion and stabilised outer portion to provide a stabilised combined image.

* * * * *